United States Patent [11] 3,626,001

| [72] | Inventors | Willis C. Keith<br>Flossmoor;<br>Emmett H. Burk, Jr., Glenwood, both of Ill. |
|---|---|---|
| [21] | Appl. No. | 728,037 |
| [22] | Filed | May 9, 1968 |
| [45] | Patented | Dec. 7, 1971 |
| [73] | Assignee | Atlantic Richfield Company<br>New York, N.Y. |

[54] METHOD FOR THE PRODUCTION OF HIGH-PURITY ISOPHTHALIC OR TEREPHTHALIC ACID
23 Claims, No Drawings

| [52] | U.S. Cl. | 260/574 R |
|---|---|---|
| [51] | Int. Cl. | C07c 63/02 |
| [50] | Field of Search | 260/524 |

[56] References Cited
UNITED STATES PATENTS

| 2,962,361 | 11/1960 | Spiller et al. | 260/524 |
|---|---|---|---|
| 3,240,803 | 3/1966 | Thompson et al. | 250/524 |

*Primary Examiner*—Lewis Gotts
*Assistant Examiner*—R. S. Weissberg
*Attorney*—McLean, Morton and Boustead

ABSTRACT: A method for the production of high purity isophthalic or terephthalic acid from a $C_8$ aromatic hydrocarbon feed stock containing a major amount of the desired isomer of xylene corresponding to the desired acid. The method comprises the two-stage oxidation of the isomer of xylene while limiting the amount of orthophathalic acid and water present in the oxidation feed. The feed contains the desired xylene isomer in an alkanoic acid solvent and contains a cobalt catalyst. An alkanal is added to the second stage of the oxidation method and the amount of alkanal added is adjusted with respect to the oxygen partial pressure. An oxidation product representing at least 75 percent conversion of xylene to the corresponding acid is obtained.

METHOD FOR THE PRODUCTION OF HIGH-PURITY ISOPHTHALIC OR TEREPHTHALIC ACID

This invention relates to a two-stage process for producing high purity benzene dicarboxylic acids. More particularly, it concerns an efficient multistage oxidation process for producing high-purity isophthalic or terephthalic acid in high yields.

Methods for the production of aromatic polycarboxylic acids such as terephthalic acid and isophthalic acids are of increasing interest at the present time due to the high degree of commercial importance of these products. For example, various aromatic dicarboxylic acids, and particularly isophthalic and terephthalic acids, have come to have considerable commercial importance in the formation of polymers useful in the production of coating compositions, films, fibers, and filaments, and many other valuable products. The character of such polymerization reactions, however, requires a relatively high degree of purity in the acids used in these reactions, since the byproducts and impurities formed in the production of the acids often interfere with the achievement of desired properties in the polymer. Monomer purity has been found to be particularly significant in the polymerizations of polyester resins intended for use as textile fibers. The necessary purity of such aromatic dicarboxylic acids for use in these reactions has been difficult to achieve in commercial scale plants for the production of isophthalic and terephthalic acids. Accordingly, there is a need for new and improved processes for the production of such acids.

It is known, for example, to oxidize substituted aromatics directly with air to the corresponding dicarboxylic acid. Multistage oxidation processes have also been developed for the production of such benzene dicarboxylic acids as isophthalic acid and terephthalic acid from, respectively, meta-xylene and para-xylene. One such multistage process is described in U.S. Pat. No. 3,240,803 wherein the xylene starting material is first oxidized in an initial stage to the corresponding toluic acid and then subsequently further oxidized to the desired benzene dicarboxylic acid in a second stage. Although such two-stage oxidization processes are known, these processes typically do not result in a benzene dicarboxylic acid having the purity and color desired. The present invention is directed to a two-stage, liquid phase catalytic oxidation process for the production of isophthalic or terephthalic acid wherein the desired benzene dicarboxylic acid is produced in high purity and good yield. Moreover, by effectively maintaining catalyst activity and high conversion levels in the intermediate toluic acid stage and in the benzene dicarboxylic acid product stage, recovery of a high-purity product in good yield can be accomplished in an economically feasible system.

In general, the process of the present invention is a two-stage process including a first oxidation stage wherein a $C_8$ aromatic, or xylene feed, rich in meta-xylene or para-xylene and containing only a limited amount of ortho-xylene and water, is contacted with a molecular oxygen-containing gas in the presence of a lower alkanoic acid solvent and a cobalt catalyst system to produce as the first stage product an intermediate partially carboxylated benzene product, i.e., a benzene product having at least one carboxyl substituent and a lower alkyl substituent, meta- or para- to each other and principally meta- or para-toluic acid. Desirably, the first stage product represents at least 50 percent and preferably about 75 percent, or more, conversion of the meta-xylene, or para-xylene, in the feed to the corresponding toluic acid. The intermediate, or first-stage product is then further contacted with a molecular oxygen-containing gas in a second oxidation stage, in the presence of a cobalt catalyst and an alkanal promoter to form the corresponding fully carboxylated acid product, i.e., isophthalic acid, or terephthalic acid, with an overall conversion of the meta-xylene or para-xylene in the initial feed to the corresponding phthalic acid of at least about 70 percent, and preferably, above about 90 percent, e.g. 90 to 99 percent.

The production of high-purity isophthalic or terephthalic acids in high yields involves maintenance of specific catalyst activity in the two stages and high conversion rates, i.e., at least about 50 percent, preferably about 75 percent or more, to the intermediate carboxylic acid product and at least about 70 percent, preferably about 90 percent or more, to the final carboxylic acid product in the process of the invention. Maintenance of high conversion in the instant process is, in turn, dependent upon control of such parameters of the process as the amounts of water and orthoxylene in the feed to the first and second stages in as much as excess amounts of either water or orthophthalic acid, which is produced by oxidation of the orthoxylene in the feed, adversely affect catalyst activity and the rate of conversion to the intermediate and final products. Additional features employed in the process of this invention contributing to the attainment of high product purity, high conversion rates, etc., generally include the use of relatively high oxygen partial pressures, particularly in the second oxidation stage; the employment of specific catalyst concentrations in the two oxidation stages; the use of at least two reactors in the second oxidation stage; the maintenance of a homogeneous mixture of materials in all of the reactors by, for instance, recirculation of the reactants within the reactor, etc. These features and parameters will be more fully discussed hereinbelow.

As aforementioned, a plurality of oxidation reactors, e.g. columns or stirred vessels, are employed in the second stage and, preferably, a plurality of reactors are used in both stages of the oxidation reaction to achieve high conversion to both the intermediate product, principally meta-toluic acid, or para-toluic acid, and the final product, principally isophthalic acid or terephthalic acid. Although the number of reactors used in the overall process of this invention can vary depending upon composition of feed, conversion desired, efficiency of overall system, etc., good results can be obtained using four reactor columns, two in each stage, arranged in series. Advantageously, the reactors in both stages are designed to aid in effecting the desired high conversion to the intermediate toluic acid and final benzene dicarboxylic acids. In addition to adversely affecting purity and yield of the product, low conversion levels increase production of undesirable intermediate oxidation products capable of being reduced (referred to as reducibles) which may crystallize with the desired dicarboxylic acid product to have a detrimental effect on the quality of the final product. Such reducibles include the isomers of phthalaldehydic acid, tolualdehyde and benzaldehyde. Other impurities which can undesirably affect the product are isomeric forms of the particular phthalic acid being produced, the isomers of toluic acid and benzoic acid and trace metal compounds resulting from residues of the catalyst and corrosion in the reaction system, principally iron and cobalt.

Homogeneous reactors, that is, reactors approaching homogeneous conditions, e.g. reactors in which the oxygen concentration, for example, in the top of the reactor is for practical purposes the same as the oxygen concentration at the base of the reactor, have been found to enhance conversion to the intermediate and final carboxylic products. Homogeneity is preferably maintained in the oxidation reactors by externally recycling liquid reaction mixture from the top to the bottom of the reactor at a rate sufficient to provide good mixing and avoid settling of larger crystals, e.g. at rates of about 0.05 to 5, particularly about 0.1 to 1 linear feet per second, in an amount sufficient to maintain a $\Delta t$ between the bottom and top of the reactor of $\cong <50°$ F., preferably about 1° to 10° F. The employment of homogeneous reactors in the process of the invention is further advantageous since such reactors contribute to the high utilization of the alkanal promoter in the second stage.

The two-stage oxidation process of the present invention, as discussed above, involves oxidation of the alkyl groups of a $C_8$ alkyl-substituted aromatic, e.g. xylene feed to the corresponding monocarboxylic acid in a first oxidation stage and the subsequent oxidation of the monocarboxylic acid in a second oxidation stage to the corresponding aromatic dicarboxylic acid. The feed to the first oxidation stage normally comprises the xylene feedstock contained in an solvent therefor which preferably is a lower alkanoic acid, particularly one containing about two to four carbon atoms such as acetic acid. The solvent may, for example, desirably be a recycle stream from subsequent portions of the process after the dicarboxylic acid product is recovered and the solvent desirably is also a solvent for the cobalt catalyst system used in the oxidation process of this invention. The feed to the first oxidation stage is, therefore, typically composed of fresh xylene feedstock and a recycle stream containing primarily a solvent and catalyst mixture. Normally, between about 5 to 15 weight percent, preferably about 8 to 12 weight percent, of the feed to the first oxidation stage is fresh xylene. Such amounts of xylene provide pumpable slurries as the second oxidation stage products upon formation of the corresponding phthalic acid. The first oxidation stage is preferably conducted in two reactors, as mentioned above, employing more or less similar conditions. Generally, above about 50 percent of the xylene in the feed to each oxidation stage is converted to the corresponding mono carboxylic acid in each of the reactors to provide an overall conversion of above about 75 percent. The conversion can be increased by increasing the residence time within the first oxidation stage.

In general, the greater the degree of purity of the xylene employed, the greater the degree of purity of the final dicarboxylic acid product. There are, however, two possible constituents of the feed to the first oxidation stage which can, as mentioned above, adversely effect the rate of conversion of the xylene to the corresponding phthalic acid and the purity of the final product. These are orthophthalic acid and water and their presence in the feed is carefully controlled. Orthophthalic acid, for example, converts the cobalt catalyst to a noncatalytic form and excess water tends to inhibit the desired oxidation reaction. It is desirable that the feed to the first oxidation stage not contain more than about 5 weight percent and preferably less than about 3 weight percent, orthophthalic acid. Since orthophthalic acid is produced by oxidation of ortho-xylene in the aromatic feed stock, control of the amount of ortho-xylene in the aromatic feedstock can reduce the amount of orthophthalic acid which must be removed from the recycle acid and thereby assist in maintaining low orthophthalic acid concentrations. It would, of course, be preferable to have no ortho-xylene in the aromatic feedstock and no orthophthalic acid in feed to the first oxidation stage; however, since commercially available xylenes typically contain some ortho-xylene, its presence, within the limits defined, is tolerated. The aromatic feedstock typically will also contain a small amount of $C_8$ aromatics boiling in the same range as the xylene feed, e.g., about 250° to 290° F., such as ethylbenzene, etc. Typical aromatic feedstocks employed in the process of this invention contain above 90, and preferably above about 95 or more, weight percent of the desired meta-xylene or para-xylene reactant. Such meta-xylene feed stocks can be obtained, for instance, by selective sulfonation and desulfonation of a mixed xylene feed. Para-xylene is produced by crystallization of such a feed. Generally, water is present in the feed to the first oxidation stage only in an amount sufficient to insure solubilization of the cobalt catalyst system, e.g., generally above about 0.1 weight percent, but below about 4, or 3, weight percent, based upon the feed to the first oxidation stage. Preferably, water is present in amounts of about 0.5 to 1.5 weight percent.

In addition to the above discussed feed components, a small amount, e.g. about 0.1 mole per kilogram of feed, of an alkanal can be present, but is not required, in the first oxidation stage to initiate or serve to propagate the reaction, e.g., act as a chain carrier. Suitable alkanals include a lower alkanals or the alkanal corresponding to the solvent such as acetaldehyde and when used, the alkanal, e.g., acetaldehyde, is present in an amount only sufficient to initiate or propagate the reaction.

The catalyst system employed in the first oxidation stage contains cobalt in the form of an organic acid salt, or other compound which is soluble in the particular solvent used. Cobalt acetate is preferable although the benzoates, toluates, etc., of cobalt can also be used. Such cobalt compounds can be found in both bivalent and trivalent forms. Generally, the catalyst in the feed to the first stage is all in the bivalent form since it is reduced in processing, e.g. distillation of the recycle stream which contains the catalyst. However, generally about 10 percent, and up to about 50 percent, usually about 25 to 40 percent, of the cobalt catalyst present in the first oxidation stage is in the trivalent form and the remainder in the bivalent form since the conditions maintained in the first stage oxidation reaction appear to produce the trivalent form. In general, the total amount of catalyst in the first oxidation stage is above about 0.05, and up to about 0.12, or 0.15 moles of cobalt per kilogram of feed employed. The upper limit to the amount of catalyst is a matter of solubility and economics and, desirably, the amount of catalyst is about 0.12 moles per kilogram of feed employed since, although the reaction increases with catalyst concentration up to this amount, it becomes independent of the amount of cobalt present above approximately this amount. As mentioned above, it is desired to have only small amounts, if any, of orthophthalic acid present in the feed or ortho-xylene in the feedstock. It is theorized, for example, that the cobalt acetate catalyst reacts with orthophthalic acid to produce a cobalt complex which is inactive and does not catalyze the reaction.

The first oxidation stage is generally operated at a temperature sufficient to carry out the desired oxidation in a reasonable amount of time, e.g., about 0.5 to 5 hours, or longer, if acceptable, preferably about 0.5 to 3 hours, but insufficient to cause the formation of substantial amounts of carbon dioxide by oxidation of the solvent, e.g. acetic acid. The time required for oxidation increases substantially with a decrease in temperature. Temperatures of about 210°–300° F., preferably about 230° to 275° F. are suitable. Elevated pressures suitable to maintain the reaction mixture in liquid form at the desired temperatures can be used, e.g. about 50 to about 1,000 or more p.s.i.a. but should not be sufficient to maintain essentially liquid phase and keep vapor pressure of solvent in satisfactory range. The upper pressure is usually a matter of economics, although pressures in the explosive range are to be avoided. It is desirable that ample oxygen, i.e., a substantial excess of oxygen, be present in the first oxidation stage to oxidize the xylene present therein. Oxygen partial pressures in the first oxidation stage of about 5 to 500 p.s.i.a., preferably about 10 to 25, or to 50 p.s.i.a. are suitable. Air or air enriched with molecular oxygen can be advantageously employed as the oxidizing agent.

The effluent from the first oxidation stage is generally fed directly to the second oxidation stage and which advantageously includes two, or more, separate reactors. The second oxidation stage is typically maintained at a temperature of about 190° to 260° F., or 275° F., preferably about 230° to 250° F. and a pressure sufficient to maintain the reactants in the liquid phase, e.g. about 50 to 1,000 p.s.i.a., or more for a time sufficient to oxidize at least about 50 percent of the toluic acid present and preferably above 0.5 to 5, preferably 0.5 to 3 hours, are suitable. Several of the variables discussed above with regard to the first oxidation stage also play an important role in the second oxidation stage wherein the monocarboxylic, i.e. toluic acid is converted to the corresponding dicarboxylic or phthalic acid. In addition, the amount of aldehyde in the reaction mixture within the second oxidation stage and the partial pressure of oxygen within the second oxidation stage play an important role in maintaining high conversion rates of the toluic acid to the corresponding phthalic acid and, consequently, to the purity and color of the final product. The amount of water in the feed to the second oxidation stage, for example, is generally below about 5 percent weight, preferably about 1 to 3 percent weight, of the total feed to the second stage but an amount sufficient to insure solubilization of the cobalt catalyst. Orthophthalic acid is also undesirable in the second oxidation stage. The reaction mixture within the second oxidation stage should contain less than about 5 weight percent, preferably less than about 3 weight percent.

The active catalyst within the second oxidation stage is the trivalent form of cobalt so that its presence in substantial amounts is necessary. Generally, about 0.05 to 0.15, or more, moles of cobalt per kilogram of feed are present in the feed to the second oxidation stage. The reaction mixture in the second oxidation stage desirably contains at least about 30 percent, preferably about 65 percent, or more, and could contain up to 100 percent of the cobalt catalyst in the trivalent or cobaltic form. The presence of xylene within the second oxidation stage is also a factor in determining the conversion rate of the reaction within the second oxidation stage since xylene serves as a reducing agent to rapidly reduce the active catalyst system, i.e. trivalent or cobaltic form of the catalyst at the temperature within the second oxidation stage. Reduction of the trivalent or cobaltic catalyst provides a nonactive catalyst for the second stage which will not promote reaction of the toluic acid to give the corresponding phthalic acid. The xylene fed to the second oxidation stage is, however, very rapidly converted to the corresponding toluic acid as it enters the second oxidation stage due to the presence of aldehyde to that within the second oxidation stage the amount of xylene is normally either not detectable or less than about 500 p.p.m. In a two reactor second oxidation stage, the xylene will be present in the first reactor in amounts less than about 500 p.p.m. and in the second reactor in nondetectable amounts.

The amount of aldehyde in the second oxidation stage and the partial pressure of oxygen in the second oxidation stage are important factors, and, these two factors will, in fact, determine the amount of conversion in the second oxidation stage. With two reactors, conversions of about 70 percent in the first reactor and about 75 percent in the second reactor are possible. One role of the aldehyde is to generate the trivalent or cobaltic form of the cobalt catalyst through reaction of peracetic acid and the bivalent form of cobalt. Continuous regeneration is required since the trivalent form of cobalt is rapidly reduced to the bivalent form in the second stage oxidation. Generally, about 0.5 to 0.05 moles, preferably about 0.1 to 0.3 moles of the aldehyde corresponding to the alkanoic acid solvent, e.g. acetaldehyde per kilogram of total feed to the second oxidation stage is suitable. Companion partial pressures of oxygen are generally in the range of about 10 to 500 p.s.i.a., preferably about 25 to 150 p.s.i.a. The partial pressure of oxygen and the amount of aldehyde required to obtain conversion of toluic acid to phthalic acid are interdependent factors. As the partial pressure of oxygen is lowered, for example, an increase in the amount of aldehyde fed will be required to maintain the maximum conversion. It is desired to have a product out of the second stage with at least about 70 percent, preferably about 90 percent mole, aromatic dicarboxylic acid, i.e. isophthalic or terephthalic acid, based on the total aromatics in the product.

Following the second oxidation stage, the product which typically is a slurry containing the phthalic acid corresponding to the xylene feedstock, can be conveyed to a solid-liquid separation zone for removal of the solid phthalic acid product. The mother liquor is then recycled to the first oxidation stage. Typically, in the recycle system, the mother liquor is passed through a distillation column to reduce the water content to the level desirable for the feed to the first oxidation stage. Distillation temperatures of about 225° to 300° F. are suitable. With a suitable distillation column the overhead can contain about one mole percent acetic acid in 99 mole percent water but other systems could be used. Additionally, in the recycle system a portion of the mother liquid can be fed to a catalyst recovery system wherein orthophthalic acid is removed to maintain the amounts thereof within the limits desired for feed to the first oxidation stage. Generally, the amount of the recycle stream fed to the catalyst recovery system is sufficient to remove orthophthalic acid in amounts sufficient to provide a suitable feed for the first oxidation stage. Amounts of about 5 to 25 weight percent, preferably about 5 to 15 percent, of the recycle liquor may be passed to the catalyst recovery system.

The following examples serve to further illustrate the invention.

EXAMPLE I

A m-xylene feedstock was oxidized to isophthalic acid in a two-stage oxidation process having two reactors in each stage. The m-xylene feedstock had the typical composition of table I.

TABLE I

|  | % |
|---|---|
| Toluene | 0.10 |
| Ethylbenzene | 0.44 |
| p-Xylene | 1.46 |
| m-Xylene | 97.16 |
| o-Xylene | 0.64 |
| nonaromatic $C_8$ | 0.20 |

Table II below sets forth the feed and product compositions and conditions for each reactor in two different runs. The feed to reactor No. 1 for run 1 was a solvent recycle stream containing from 1 to 1.5 percent weight orthophthatlic acid and for run II was a fresh catalyst-containing solvent stream containing about 1.0 weight percent orthophthalic acid.

TABLE II

| | Run Number | | | | | | | |
|---|---|---|---|---|---|---|---|---|
| | I | | | | II | | | |
| Reactor No. | 1 | 2 | 3 | 4 | 1 | 2 | 3 | 4 |
| Conditions: | | | | | | | | |
| Residence time (hr.) | 1.03 | 1.03 | 0.77 | 0.81 | 1.01 | 0.97 | 0.94 | 0.87 |
| Temperature (° F.) | 250 | 250 | 240 | 240 | 255 | 255 | 240 | 240 |
| m-Xylene (mole kg.-1. feed) | 1.0 | | | | 0.95 | | | |
| Catalyst (mole kg.-1. feed) | 0.13 | | | | 0.13 | | | |
| Pressure (p.s.i.g.) | 300 | 300 | 300 | 300 | 300 | 300 | 300 | 300 |
| Feed: | | | | | | | | |
| Total feed (kg./hr.) | 7.60 | 8.13 | 8.88 | 9.485 | 7.66 | 8.30 | 9.10 | 9.90 |
| Catalyst (mole/hr.) | 0.99 | 1.029 | 1.029 | 1.029 | 1.0 | 1.05 | 1.05 | 1.05 |
| m-Xylene (mole/hr.) | 7.60 | (4.73) | 1.78 | 0.01 | 7.26 | 3.61 | 1.18 | |
| m-Toluic acid (mole/hr.) | 0.43 | 3.38 | 5.13 | 2.12 | 0.98 | 4.14 | 5.03 | 2.29 |
| Isophthalic acid (mole/hr.) | 0.0 | 0.22 | 1.42 | 6.20 | 0.0 | 0.87 | 2.24 | 4.36 |
| Acetaldehyde (mole/hr.) | 0.0 | 0.0 | 1.50 | 1.50 | 0.0 | 0.0 | 1.52 | 1.52 |
| Water (mole/hr.) | 5.36 | 9.3 | 15.01 | 21.10 | 6.18 | 11.45 | 17.2 | 22.8 |
| Oxygen (mole/hr.) | 10.8 | 10.8 | 33.7 | 21.7 | 11.3 | 11.3 | 34.2 | 22.5 |
| Product: | | | | | | | | |
| Total product (kg./hr.) | 7.83 | 8.33 | 9.285 | 9.655 | 7.87 | 8.50 | 9.40 | 10.14 |
| m-Xylene (mole/hr.) | 4.43 | 1.78 | 0.10 | 0.0 | 3.2 | 1.18 | | 0.0 |
| m-Toluic acid (mole/hr.) | 3.38 | 5.13 | 2.12 | 0.37 | 4.14 | 5.03 | 2.29 | 0.61 |
| Isophthalic acid (mole/hr.) | 0.22 | 1.42 | 6.20 | 7.90 | 0.87 | 2.24 | 6.38 | 8.05 |
| Water (mole/hr.) | 9.30 | 15.01 | 21.10 | 25.0 | 11.45 | 17.2 | 22.8 | 26.4 |
| Oxygen (mole/hr.) | 4.5 | | | | 9.65 | | 34.6 | |
| Carbon monoxide (mole/hr.) | 0.08 | | | | 0.11 | | 0.20 | |
| Carbon dioxide (mole/hr.) | 0.81 | | | | 1.10 | | 1.90 | |
| Recovery (mole percent) | 100 | 100 | 100 | 99.4 | 100 | 97.7 | 100 | 100 |
| Conversion (percent): | | | | | | | | |
| MX→MTA | 41.8 | 62.4 | 99.9 | 100 | 55.8 | 67.4 | 100 | 100 |
| MX+MTA→IPA | 2.74 | 17.5 | 69.0 | 82.5 | 10.5 | 17.7 | 66.5 | 75.5 |
| Percent oxygen effluent gas | 8.78 | | About 15 | | 9.5 | | About 15.9 | |

The isophthalic acid product was separated in each run and tested for purity. In each case the product purity was superior to a similar product produced by a one-stage oxidation with runs I and II having reducible contents of less than 0.077 and 0.14 percent weight whereas the product of the one-stage oxidation process has above 0.37 percent weight reducibles as well as a high cobalt content ($\approx$300 p.p.m.) which is also indicative of an impure product.

EXAMPLE II

To demonstrate the high rate of conversion of dialkylbenzene to intermediate toluic acid obtained using two reactors in series, following recycle feedstock was treated in the first of the first stage of the present invention at a temperature of 250° F.:

| | |
|---|---|
| Water Wt. % Feed | 1.2 |
| Cobalt Mole kg$^{-1}$ | 0.13 |
| m-Xylene Mole KG | 0.80±0.02 |
| m-Toluic Acid Mole KG$^{-1}$ | 0.164 |
| Mole O$_2$/Mole Feed | 3.0 |

It was found that for the same period of reaction time the conversion can be slightly improved by increasing the temperature. Also, the conversion increases as the reaction time increases. A conversion of about 50 percent of the meta-xylene in a feed containing 1 percent weight orthoxylene to the intermediate toluic acid is obtained with 1-hour holding time in the reactor. The effluent from the first reactor was treated in a second reactor at 250° F. for about 0.7 hour. The conversion in the second reactor did not show a marked dependence on temperature and a total conversion of about 75 percent is obtained. With a feed containing 0 weight percent orthoxylene, holding times of 0.5 hours in the first and second reactors gives a total conversion of up to about 75 percent. The results indicate definite advantage in using two reactors in series.

EXAMPLE III

To demonstrate the effectiveness of two reactors in series in the second stage, a feed equivalent to the effluent from the second reactor of the first stage was employed, with the exception that the isophthalic acid produced was omitted due to difficulties in handling. The composition of the feed is based on 2-hour reaction time at 250° F. in the first stage. The first stage resulted in about 75 percent of the meta-xylene and 16.5 percent conversion to isophthalic acid.

In the first reactor of the second stage complete conversion of the m-xylene is realized and about 65 percent of the feed is converted to isophthalic acid as follows.

| Run Number | 1 | 2 | 3 | 4 | 5 |
|---|---|---|---|---|---|
| Conditions: | | | | | |
| Reaction time (hrs.) | 0.50 | 0.93 | 1.12 | 1.11 | 2.30 |
| Temperature, °F | 240 | 240 | 240 | 240 | 240 |
| Pressure (p.s.i.g.) | 300 | 300 | 300 | 300 | 300 |
| Percent O$_2$ (effluent) | 13.6 | 12.9 | 14.01 | 14.07 | 14.10 |
| Feed composition (Mole kg.-1): | | | | | |
| Acetaldehyde | 0.12 | 0.15 | 0.13 | 0.17 | 0.16 |
| MX | 0.24 | 0.13 | 0.23 | 0.12 | 0.25 |
| MTA | 0.59 | 0.50 | 0.43 | 0.53 | 0.57 |
| H$_2$O | 1.52 | 1.75 | 1.83 | 1.79 | 1.70 |
| Percent conversions: | | | | | |
| MX (*) | 99.9 | 100 | 100 | 100 | 100 |
| MX+MTA+IPA | 65.1 | 65.7 | 65.1 | 64.8 | 66.8 |

* A trace of unreacted MX was detected in Run No. 1.

The effluent from the first reactor of the second stage has the following compositions:

| | Mole Kg-1 | Wt. % |
|---|---|---|
| MX | 0.0 | 0.0 |
| MTA | 0.269 | 3.67 |
| IPA | 0.65 | 10.73 |
| H$_2$O | 2.19 | 3.95 |
| Co (a) | 0.11 | 0.655 |

(a) About 50 percent as Co$^{+++}$.

The composition of the feed for the second reactor omitting the IPA would be:

| | Mole Kg-1 | Wt. % |
|---|---|---|
| MTA | 0.30 | 4.08 |
| H$_2$O | 2.46 | 4.43 |
| Co (about 50% as Co$^{+++}$) | 0.124 | 0.732 |

The oxidation reaction in the second reactor of the second stage was run as reaction times of about one-half hour and 1 hour respectively, at various concentrations of acetaldehyde. The pertinent data are summarized in the following table:

| Run Number | 1 | 2 | 3 | 4 |
|---|---|---|---|---|
| Conditions: | | | | |
| Time (hours) | 1.16 | 1.18 | 0.58 | 0.57 |
| Temperature, °F | 240 | 240 | 240 | 240 |
| Pressure (p.s.i.g.) | 300 | 300 | 300 | 300 |
| Percent O$_2$ (effluent) | 15.0 | 16.8 | 14.7 | 15.5 |
| Aldehyde mole kg.-1 feed | 0.126 | 0.042 | 0.126 | 0.90 |
| Percent cov. to IPA | 71.8 | 35.9 | 75.0 | 69.0 |

The above data show a rapid increase in conversion up to about 0.1 mole aldehyde kg.$^{-1}$ feed and very little increase in conversion above this concentration, where the reaction apparently becomes independent of aldehyde. As can be seen, a total conversion for both stages, which includes conversion in the first stage, of about 92 percent can be obtained. This substantial increase illustrates the effectiveness of the two-stage process of the present invention and more than one reactor in the second stage.

EXAMPLE IV

To illustrate the effect of orthophthalic acid (OPA) upon the process, several runs were made at different acid concentrations using the same acetic acid feedstock containing

| | |
|---|---|
| m-xylene (mole/Kg.) | 1.00 |
| catalyst (mole/Kg.) | 0.120 |
| water (wt. %) | 1.000 |

Table I presents the data obtained for the first stage oxidation.

TABLE I

| | | | |
|---|---|---|---|
| Reaction time at 250° F.(hrs.) | 2 | 2 | 2.5 |
| No. of reactors | 1 | 2 | 2 |
| % conversion of m-xylene | | | |
| at 0.0% OPA | 75 | 80 | 86 |
| at 1.0% OPA | 63 | 75 | 81 |
| at 3.0% OPA | 58 | 55 | 76 |

Partial pressure of oxygen 606 ±14 mm. Hg, total pressure 14–15 p.s.i.g. In the second stage oxidation, the concentration of acetaldehyde was also varied. The feed composition and conditions for the second stage were:

| | |
|---|---|
| m-xylene (mole/kg.) | 0.24 |
| m-toluic acid (mole/kg.) | 0.60 |
| catalyst (mole/kg.) | 0.120 |
| water (wt.%) | 1.5 |
| temperature (°F.) | 240 |
| pressure (mm.Hg) | 1,455±5 |
| PP O$_2$ (mm.Hg) | 705±5 |
| Reaction time (hrs.) | 1.01 |

At 0, 1 and 3 weight percent orthophthalic acid and 0.172 moles acetaldhyde/kg. feed, the conversion of m-xylene and m-toluic acid to isophthalic acid was, respectively, 64.5, 43 and 24 percent. The effect of aldehyde utilization can be seen from table II. More aldehyde is required to maintain a similar level of isophthalic acid production as the orthophthalic acid concentration increases and more acetic acid is made in the process.

TABLE II

| OPA (wt. %) | 0 | 1 | 3 |
|---|---|---|---|
| temperature (°F.) | 240 | 240 | 240 |
| reaction time (Hrs.) | 1.01 | 1.01 | 1.00 |
| aldehyde (moles/hr.) | 0.172 | 0.259 | 0.420 |
| % conversion (MX+MTA →IPA) | 64.5 | 60.9 | 54.9 |
| aldehyde ratio to obtain a constant conversion (0% OPA =1.0) | 1.0 | 1.5 | 2.7 |

We claim:

1. A two-stage method for the production of a high-purity benzenedicarboxylic acid selected from the group consisting of terephthalic and isophthalic acid from $C_8$ aromatic hydrocarbon feedstock containing a major amount of the desired isomer of xylene corresponding to desired acid, oxidizing a feed comprising an alkanoic acid solvent containing about 5 to 15 weight percent of the desired xylene isomer to the corresponding toluic acid in a first oxidation stage with a molecular oxygen-containing gas, said feed containing about 0.05 to 0.15 moles cobalt per kilogram of feed as catalyst, about 0.1 to 4 weight percent water and less than 5 weight percent orthophthalic acid, the first oxidation stage being maintained at a temperature of about 210° to 300° F., a pressure of about 50 to 1,000 p.s.i.a. and an oxygen partial pressure of about 5 to 500 p.s.i.a., the feed being oxidized in the first oxidation stage for a period sufficient to provide a first stage oxidation product wherein at least about 50 percent of the xylene in the feed has been oxidized to the corresponding toluic acid, the cobalt catalyst within the first stage comprising about 10 to 50 percent trivalent cobalt and the remainder bivalent cobalt, the said first stage oxidation product containing less than about 5 weight percent orthophthalic acid and less than about 5 weight percent water, and then oxidizing the said first stage oxidation product with a molecular oxygen containing gas in at least two separate reactors in a second stage in the presence of about 0.05 to 0.15 mole per kilogram first stage product of cobalt at least about 30 percent of which is in trivalent form, and about 0.05 to 0.5 moles of alkanal corresponding to the alkanoic acid per mole of toluic acid in the first stage product at a temperature of about 190° to 275 ° F., a pressure of about 50 to 1,000 p.s.i.a. and an oxygen partial pressure of about 10 to 500 p.s.i.a. for a period of time sufficient to obtain a second stage oxidation product representing at least 75 percent of the xylene in the feed to the corresponding benzene dicarboxylic acid.

2. The method of claim 1 wherein the alkanoic acid is acetic acid and the alkanal is acetaldehyde.

3. The method of claim 2 further including separating the benzene dicarboxylic acid from the second stage oxidation product to produce a mother liquor and recycling the mother liquor to the first oxidation stage, sufficient feedstock being added to the mother liquor to form said feed.

4. The method of claim 3 wherein the feed contains less than 3 weight percent orthophthalic acid.

5. The method of claim 4 wherein the feed contains about 0.5 to 1.5 weight percent water.

6. The method of claim 5 wherein the first oxidation stage temperature is about 230° to 250° F. and the feed is oxidized for a time sufficient to oxidize at least about 75 percent of the xylene to the corresponding toluic acid.

7. The method of claim 6 wherein the time is about 0.5 to 5 hours.

8. The method of claim 7 wherein a small amount of the alkanal corresponding to the alkanoic acid is added to the first oxidation stage, said amount being sufficient to propagate the oxidation.

9. The method of claim 8 wherein the small amount of alkanal is less than about 0.1 mole per kilogram of feed.

10. The method of claim 7 wherein the cobalt catalyst in the first oxidation stage includes about 25 to 40 percent trivalent cobalt.

11. The method of claim 7 wherein each oxidation oxidation stage comprises a plurality of reactors having a temperature drop across the reactor of less than about 50° F. and including recirculating liquid effluent in each said reactor at a rate of at least 0.05 to 5 linear feet per second.

12. The method of claim 11 wherein the temperature drop is about 1° to 10° F.

13. The method of claim 7 wherein the partial pressure of oxygen in the first oxidation stage is about 10 to 50 p.s.i.a.

14. The method of claim 1 wherein at least 65 percent of the cobalt catalyst in the second oxidation stage is the trivalent form of cobalt.

15. The method of claim 14 wherein the amount of alkanal in the second oxidation stage is about 0.1 to 0.3 mole per kilogram of first stage oxidation product and the partial pressure of oxygen is about 25 to 150 p.s.i.a.

16. The method of claim 15 wherein the temperature in the second oxidation stage is about 230° to 250° F. and the first stage oxidation product is oxidized for a time sufficient to provide above 90 percent conversion of the xylene in the feed to the corresponding benzene dicarboxylic acid.

17. The method of claim 7 wherein at least 65 percent of the cobalt catalyst in the second oxidation stage is the trivalent form of cobalt.

18. The method of claim 17 wherein the amount of alkanal in the second oxidation stage is about 0.1 to 0.3 mole per kilogram of first stage oxidation product and the partial pressure of oxygen is about 25 to 150 p.s.i.a.

19. The method of claim 18 wherein the temperature in the second oxidation stage is about 230° to 250° F. and the first stage oxidation product is oxidized for a time sufficient to provide above 90 percent conversion of the xylene in the feed to the corresponding benzene dicarboxylic acid.

20. The method of claim 19 wherein less than 500 p.p.m. xylene are present in the second oxidation stage.

21. The method of claim 20 wherein each oxidation stage comprises a plurality of reactors having a temperature drop across the reactor of less than about 50° F. and including recirculating liquid effluent in each said reactor at a rate of at least 0.05 to 5 linear feet per second.

22. A method for the production of a high purity benzenedicarboxylic acid selected from the group consisting of terephthalic and isophthalic acid from $C_8$ aromatic hydrocarbon feedstock containing a major amount of the desired isomer of xylene corresponding to desired acid and minor amounts of ortho xylene as an impurity comprising:

first, oxidizing a feed comprising an acetic acid solvent containing about 5 to 15 weight percent of the desired xylene isomer to the corresponding toluic acid in a first oxidation stage with a molecular oxygen-containing gas, said feed containing about 0.05 to 0.15 moles cobalt per kilogram of feed as catalyst, about 0.1 to 4 weight percent water and less than 3 weight percent orthophthalic acid, the first oxidation stage being maintained at a temperature of about 210° to 300° F., a pressure of about 50 to 1,000 p.s.i.a. and an oxygen partial pressure of about 5 to 500 p.s.i.a., the feed being oxidized in the first oxidization stage for a period sufficient to provide a first stage oxidation product wherein at least about 50 percent of the xylene in the feed has been oxidized to the corresponding toluic acid, the cobalt catalyst within the first stage comprising about 10 to 50 percent trivalent cobalt and the remainder bivalent cobalt, the said first stage oxidation product containing less than about 3 weight percent orthophthalic acid and less than about 5 weight percent water, and second, oxidizing the said first stage oxidation product with a molecular oxygen containing gas in a second stage in the presence of about 0.05 to 0.15 mole per kilogram first stage product of cobalt at least about 30 percent of which is in trivalent form, and about 0.05 to 0.5 moles of acetaldehyde per mole of toluic acid in the first stage product at a temperature of about 190° to 275° F., a pressure of about 50 to 1,000 p.s.i.a. and an oxygen partial pressure of about 10 to 500 p.s.i.a. for a period of time sufficient to obtain a second stage oxidation product representing at least 75 percent conversion of the xylene in the feed to the corresponding benzene dicarboxylic acid, third, separating the desired terephthalic acid or isophthalic acid to produce a mother liquor and, fourth, recycling the mother liquor to the first oxidation stage while, fifth, removing sufficient orthophthalic acid from the mother liquor so as to maintain the orthophthalic acid content in the first stage oxidation product below about 5 weight percent.

23. A two-stage method for the production of a high-purity benzenedicarboxylic acid selected from the group consisting of terephthalic and isophthalic acid from $C_8$ aromatic hydrocarbon feedstock containing a major amount of the desired isomer of xylene corresponding to desired acid and minor amounts of ortho xylene as an impurity comprising:

first, oxidizing a feed comprising an acetic acid solvent containing about 5 to 15 weight percent of the desired xylene isomer to the corresponding toluic acid in a first oxidation stage with a molecular oxygen-containing gas, said feed containing at least about 0.05 moles cobalt per kilogram of feed as catalyst, about 0.1 to 4 weight percent water and less than 3 weight percent orthophthalic acid, the first oxidation stage being maintained at a temperature of about 210° to 300° F., a pressure of about 50 to 1,000 p.s.i.a. and an oxygen partial pressure of about 5 to 500 p.s.i.a., the feed being oxidized in the first oxidation stage for a period sufficient to provide a first stage oxidation product wherein at least about 50 percent of the xylene in the feed has been oxidized to the corresponding toluic acid, the cobalt catalyst within the first stage comprising about 10 to 50 percent trivalent cobalt and the remainder bivalent cobalt, the said first stage oxidation product containing less than about 3 weight percent orthophthalic acid and less than about 5 weight percent water, and second, oxidizing the said first stage oxidation product with a molecular oxygen containing gas in at least two separate homogeneous reactors in a second stage in the presence of about 0.05 mole per kilogram first stage product of cobalt at least about 30 percent of which is in trivalent form, and about 0.05 to 0.5 moles of acetaldehyde per mole of toluic acid in the first stage product at a temperature of about 190° to 275° F., a pressure of about 50 to 1,000 p.s.i.a. and an oxygen partial pressure of about 10 to 500 p.s.i.a. for a period of time sufficient to obtain a second stage oxidation product representing at least 75 percent conversion of the xylene in the feed to the corresponding benzene dicarboxylic acid, third, separating the desired terephthalic acid or isophthalic acid to produce a mother liquor, fourth, recycling the mother liquor to the first oxidation stage while, fifth, removing sufficient water to maintain the water content in the feed to the first stage between about 0.1 to 4 weight percent.

* * * * *

O-1050
(5/69)

UNITED STATES PATENT OFFICE
CERTIFICATE OF CORRECTION

Patent No. 3,626,001      Dated December 7, 1971

Inventor(s) Willis C. Keith; Emmett H. Burk, Jr.

It is certified that error appears in the above-identified patent and that said Letters Patent are hereby corrected as shown below:

Claim 1, line 34, after "75%" insert --conversion--.

Claim 11, line 1, omit "oxidation" (first occurrence).

Claim 19, line 3, after "oxidation" insert --stage--.

Signed and sealed this 23rd day of May 1972.

(SEAL)
Attest:

EDWARD M. FLETCHER, JR.
Attesting Officer

ROBERT GOTTSCHALK
Commissioner of Patents